United States Patent [19]

Yoshida

[11] Patent Number: 5,315,618
[45] Date of Patent: May 24, 1994

[54] APPARATUS AND METHOD OF CANCELING PERIODIC CARRIER PHASE JITTER

[75] Inventor: Atsushi Yoshida, Tokyo, Japan
[73] Assignee: NEC Corporation, Japan
[21] Appl. No.: 775,274
[22] Filed: Oct. 11, 1991

[30] Foreign Application Priority Data

Oct. 11, 1990 [JP] Japan .................................. 2-272799

[51] Int. Cl.⁵ ........................ H03D 1/00; H04L 27/06; H04L 7/00
[52] U.S. Cl. ...................................... 375/94; 375/118; 329/307; 329/360
[58] Field of Search .................... 375/118, 119, 94, 80, 375/81, 14; 329/360, 307

[56] References Cited

U.S. PATENT DOCUMENTS

| | | | |
|---|---|---|---|
| 4,253,184 | 2/1981 | Gitlin et al. | 375/118 X |
| 4,370,749 | 1/1983 | Levy et al. | 375/119 X |
| 4,683,578 | 7/1987 | Betts et al. | 375/118 X |
| 4,689,804 | 8/1987 | Srinivasagopalan | 375/118 X |
| 4,707,841 | 11/1987 | Yen et al. | 375/118 X |
| 4,777,640 | 10/1988 | Turner et al. | 375/118 |
| 4,847,864 | 7/1989 | Cupo | 375/14 |

*Primary Examiner*—Stephen Chin
*Assistant Examiner*—Tesfaldet Bocure
*Attorney, Agent, or Firm*—Ostrolenk, Faber, Gerb & Soffen

[57] ABSTRACT

A received analog signal applied to a data modem receiver is sampled and converted into a digital signal which is demodulated into a complex baseband signal. If the demodulated complex baseband signal is deviated in phase from a QAM signal point due to phase jitter, the phase error is detected, and a replica of the phase jitter is calculated and applied to impart phase rotation for canceling out the phase jitter that is contained in the complex baseband signal. In each sampling cycle, the phase error between the phase-rotated signal and the modem output signal is detected in order to correct equations for calculating the replica of the phase jitter in the next sampling cycle.

14 Claims, 2 Drawing Sheets

APPARATUS AND METHOD OF CANCELING PERIODIC CARRIER PHASE JITTER

BACKGROUND OF THE INVENTION

1. Field of the Invention

The present invention relates to a data transmission system for transmitting QAM data over an analog line such as a telephone line, and more particularly, to an apparatus method for canceling periodic carrier phase jitter over transmission lines, in a data modem receiver.

2. Description of the Related Art

Digital data transmission using data modem receivers suffers transmission error caused by carrier phase jitter that is produced over the transmission line, resulting in a reduction in the data transmission efficiency. Various efforts have been made to reduce the phase jitter within data modem receivers.

Generally, apparatus for canceling carrier phase jitter comprises a carrier reproducing circuit for absorbing the carrier phase jitter, the carrier reproducing circuit comprising a phase-locked loop in the data modem receiver. However, as the response speed of the carrier reproducing circuit is increased for greater carrier phase jitter absorption, the carrier reproducing circuit becomes more sensitive to thermal noise from a transmission line. As the known result, the apparatus for canceling carrier phase jitter are degraded in-their overall characteristics.

Another known jitter canceler is disclosed in U.S. Pat. No. 4,639,939 assigned to NEC Corporation. The disclosed jitter canceler is more capable, in principle, of separating carrier phase jitter and thermal noise. However, since the jitter canceler is basically composed of an FIR filter, the scale and complexity of the circuit arrangement tends to be increased in order to provide sufficient jitter canceling characteristics.

SUMMARY OF THE INVENTION

In view of the above drawbacks in the conventional apparatus for canceling carrier phase jitter, it is an object of the present invention to provide an apparatus and method for canceling periodic carrier phase jitter, the apparatus having of a simpler arrangement with a high response speed and capable of reliably canceling carrier phase jitter.

According to the present invention, an apparatus is provided for canceling periodic carrier phase jitter produced over a transmission line in a data modem receiver which receives QAM data from an analog line. The apparatus comprises: a sample-hold circuit for sampling and holding a received signal, an analog-digital converter for converting an analog output signal from the sample-hold circuit into a digital signal, a demodulating circuit for demodulating the digital signal from the analog-digital converter into a complex baseband signal; a phase rotating circuit for imparting phase rotation that corresponds to a separately applied predictive signal to the complex baseband signal from the demodulating circuit, thereby generating a complex baseband signal that is compensated for a phase deviation; a decision circuit for determining the data point of a two-dimensional data point matrix of modulated signals which is closest to the compensated complex baseband signal from the phase rotating circuit and for providing a phase signal point vector corresponding to the determined data point; a phase rotation angle predicting circuit for calculating a phase rotation predictive value to compensate for the phase deviation of the complex baseband signal based on the phase error between the complex baseband signal from the demodulating circuit and the phase signal point vector from the decision circuit and for outputting a predictive signal representative of the phase rotation predictive value to the phase rotating circuit; and a predictive value correcting circuit for controlling the phase rotation angle predicting circuit to correct equations for calculating the predictive signal in the next sampling cycle based on a phase error between the complex baseband signal from the phase rotating circuit and the phase signal point vector from the decision circuit.

If the complex baseband signal is deviates in phase due to phase jitter contained in the received signal, the decision circuit employs the data point in a two-dimensional data point matrix which is closest to the deviated signal. The phase rotation angle predicting circuit detects the phase error between these signals and calculates a replica of the phase jitter component, which is a periodic function. In response to the detected phase error, the phase rotating circuit corrects the next sampled signal for the phase deviation. The equations for correcting the phase deviation are corrected in each sampling cycle by the predictive value correcting circuit. The phase jitter component contained in the received signal is therefore removed reliably, and a signal free of the phase jitter component is provided as an output from the decision circuit.

According to the present invention, there is also provided a method of canceling periodic carrier phase jitter contained in a received QAM signal using the above apparatus for canceling periodic carrier phase jitter.

The above and other objects, features, and advantages of the present invention will become apparent from the following description with reference to the accompanying drawings which illustrate a preferred embodiment of the present invention.

DETAILED DESCRIPTION OF THE PREFERRED EMBODIMENT

Figure 1:
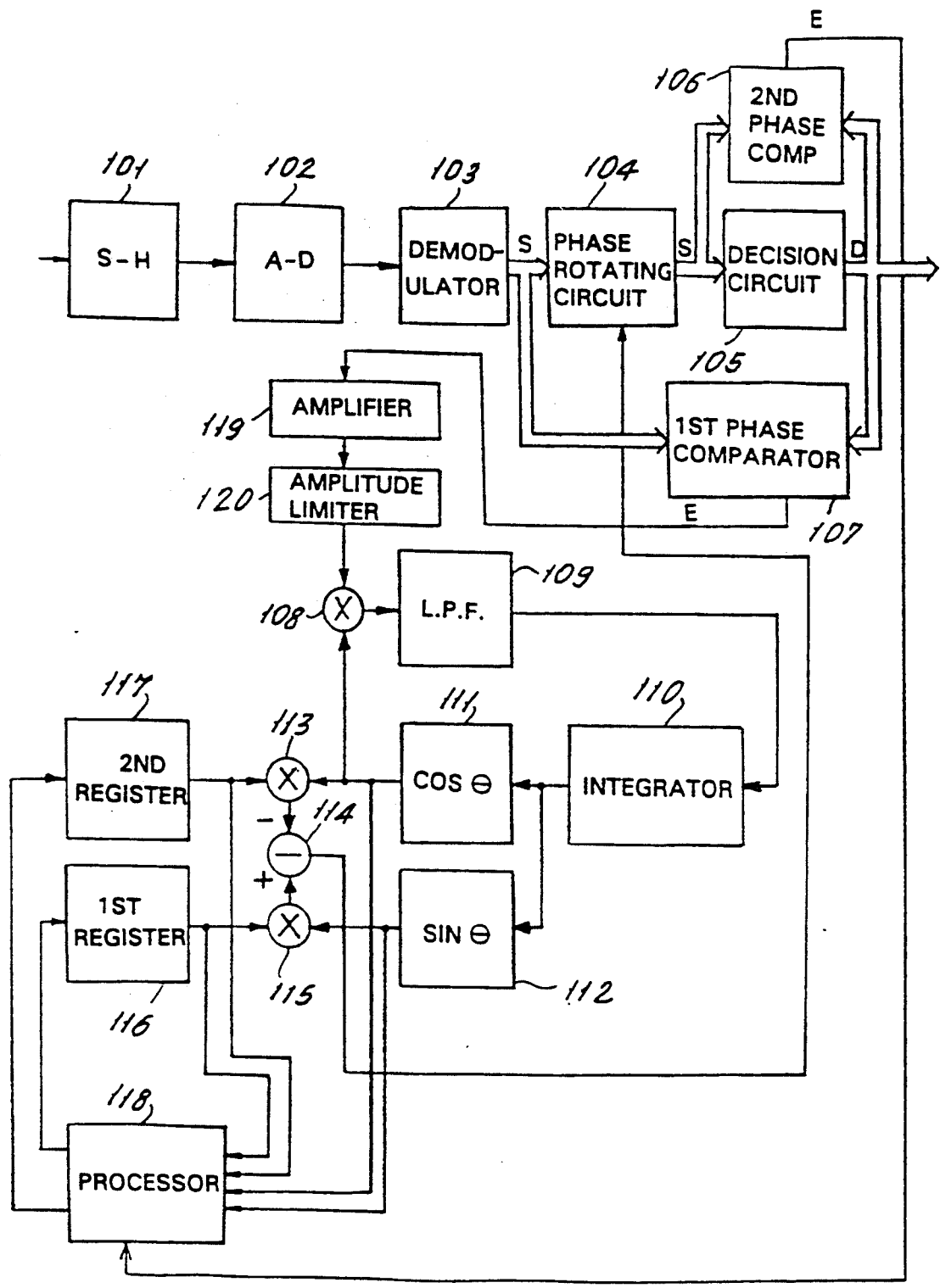
FIG. 1 is a block diagram showing an embodiment of the present invention.

Referring now to FIG. 1, an apparatus for canceling carrier phase jitter embodying the present invention is incorporated in a 16-point QAM data modem.

Figure 2:
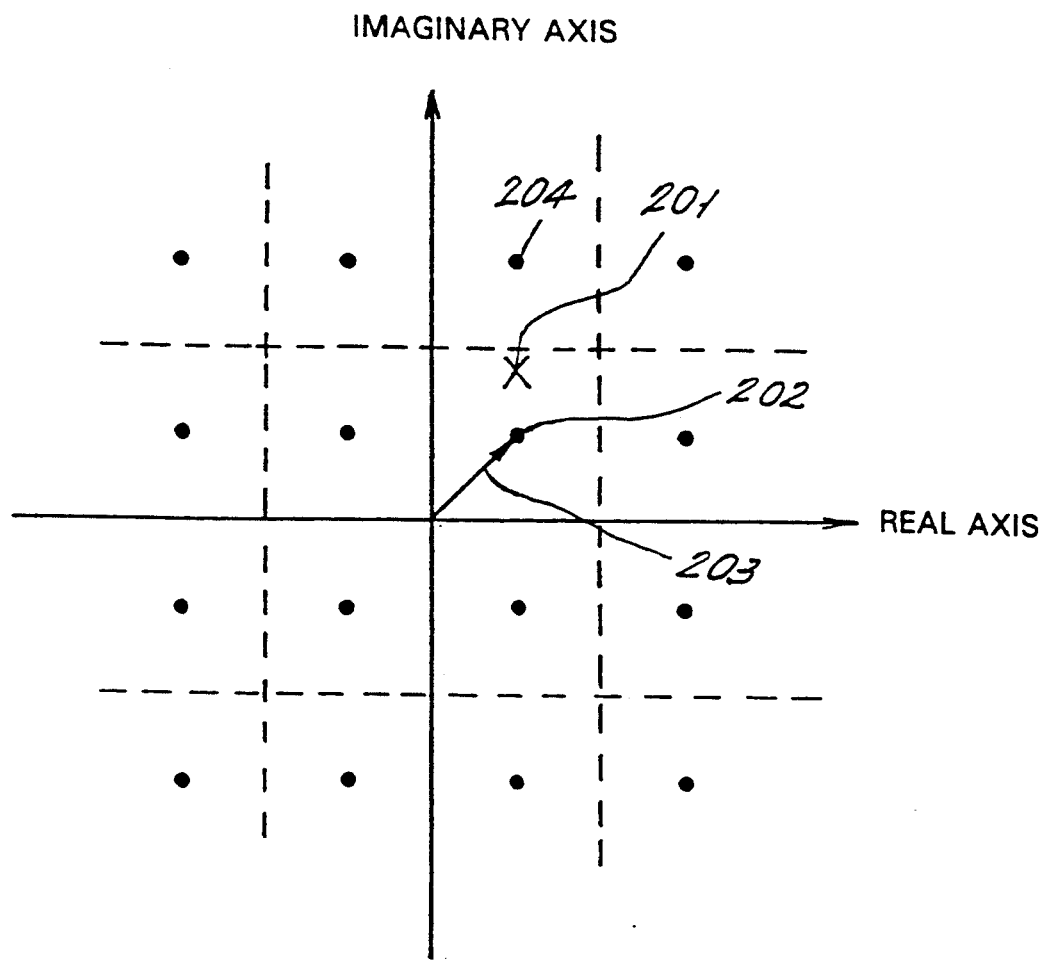
FIG. 2 is a diagram showing a two-dimensional matrix of data points in a 16-point QAM system employed in the embodiment shown in FIG. 1.

The apparatus includes a sample-hold circuit 101 for sampling and holding a received signal and an A-D (analog-digital) converter 102 for converting an analog output signal from the sample-hold circuit 101 into a digital signal. A demodulator 103 demodulates a digital output signal from the A-D converter 102 into a complex baseband signal. A phase rotating circuit 104 which is responsive to a separately applied phase rotation angle signal rotates the complex baseband signal from the demodulator 103, thereby generating a complex baseband signal that is compensated for phase deviation. A decision means 105 determines the data point of a two-dimensional data point matrix of modulated signals as shown in FIG. 2 which is closest to an output signal from the phase rotating circuit 104 and outputs a phase signal point vector corresponding to the determined data point.

The apparatus also includes a phase rotation angle predicting circuit which comprises a first phase comparator 107 for calculating the phase error between the output signal from the demodulator 103 and the output signal from the decision circuit 105. The phase rotation angle predicting circuit also comprises a sine function generator 112 for generating a signal $\sin \theta$, a cosine function generator 111 for generating a signal $\cos \theta$, an amplifier 119 for amplifying an output signal from the first phase comparator 107, and an amplitude limiter 120 for limiting the amplitude of the output signal from the amplifier 119. The phase rotation angle predicting circuit further comprises a first multiplier 108 for multiplying the output signal from the amplitude limiter 120 by the output signal from the cosine function generator 111, a low-pass filter 109 for smoothing the output signal from the first multiplier 108, an integrator 110 for integrating the output signal from the low-pass filter 109 and applying the integrated signal as an input signal $\theta$ to the sine and cosine function generators 112 and 111, a first register 116 for storing a first coefficient Cr, a second register 117 for storing a second coefficient Ci, a second multiplier 115 for calculating a signal $Cr \cdot \sin \theta$ based on output signals from the first register 116 and the sine function generator 112, a third multiplier 113 for calculating a signal $Ci \cdot \cos \theta$ based on output signals from the second register 117 and the cosine function generator 111, and a subtractor 114 for calculating the difference between output signals from the second and third multipliers 115, 13. The calculated difference is applied as a signal predictive of the phase rotation angle to the phase rotating circuit 104. The first multiplier 108, the low-pass filter 109, the integrator 110, and the cosine function generator 111 jointly serve as a phase-locked loop (PLL) which is synchronized in phase with a periodic function component contained in the phase error that is produced by the first phase comparator 107.

The apparatus further includes a predictive value correcting circuit which comprises a second phase comparator 106 for calculating the phase difference between the output signal from the phase rotating circuit 104 and the output signal from the decision circuit 105, and a processor 118 for correcting the first and the second coefficients Cr and Ci according to the following recurrence formulas:

$$Cra = Cr - \delta \cdot \epsilon \cdot \sin \theta, \text{ and}$$

$$Cia = Ci - \delta' \cdot \epsilon \cdot \cos \theta$$

where Cra, Cia are the stored contents of the first and second registers 116, 117 in the next sampling cycle, respectively, $\epsilon$ is the phase error from the second phase comparator 106, and $\delta$ and $\delta'$ are predetermined constants. The stored contents of the first and second registers 116, 117 are updated by output signals from the processor 118 for each cycle.

Operation of the embodiment will be described below.

A received signal is sampled and held by the sample-hold circuit 101 and then converted by the A-D converter 102 into a digital signal, which is then demodulated into a complex baseband signal by the demodulator 103. In the present embodiment, all circuit components other than the sample-hold circuit 101 and the A-D converter 102 carry out the required calculations according to digital signal processing. The complex baseband signal from the demodulator 103 is applied through the phase rotating circuit 104 to the decision circuit 105. The decision circuit 105 determines the data point of the applied complex baseband signal in the two-dimensional matrix of data points in a 16-point QAM system, thereby obtaining the ideal signal point vector.

More specifically, as shown in FIG. 2, sixteen ideal signal points 204 are arranged in four lines and four columns at equal intervals in a two-dimensional plane. If an output signal 201 from the phase rotating circuit 104 suffers a phase deviation, then the decision circuit 105 determines the output signal 201 to be the ideal signal point 202 closest thereto, and outputs the ideal signal point vector 203 representative of the ideal signal point 202 instead of the output signal 201. The first phase comparator 107 detects a phase error E between an output signal S from the demodulator 103 and an output signal D from the decision circuit 105 according to the equation: $E = Im[S \cdot conjg(D)]$, where $Im[S \cdot conjg(D)]$ represents an operator for extracting the imaginary part of a complex number D and conjg(D) represents an operator which takes a conjugate complex number of the complex number D.

When the receiver signal suffers carrier phase jitter interference, the phase error E contains a signal representative of a phase jitter component, which is a periodic function, with noise added thereto. The phase error E is amplified by the amplifier 119 and then converted into a rectangular wave whose amplitude is $\pm 1$ by the amplitude limiter 120. The rectangular wave has a frequency equal to that of the phase jitter component, and the amplitude thereof is $\pm 1$ at all times irrespective of the phase jitter angle.

As described above, the first multiplier 108, the low-pass filter 109, the integrator 110, and the cosine function generator 111 jointly serve as a phase-locked loop which is synchronized in phase with a periodic function component contained in the phase error E that is applied. Since the rectangular-wave output signal from the amplitude limiter 120 is applied as an input signal to the PLL, the loop band remains constant irrespective of the phase jitter angle. The sine function generator 112 is synchronized with the cosine function generator 111. The first and second registers 116, 117 store the respective coefficients Cr, Ci. The multipliers 113, 115 and the subtractor 114 jointly calculate a value $\phi$ according to the equation:

$$\phi = Cr \cdot \sin \theta - Ci \cdot \cos \theta$$

on the output signal $\sin \theta$ from the sine function generator 112, the output signal $\cos \theta$ from the cosine function generator 111 and the coefficients Cr and Ci stored in the first and second registers 116, 117.

If the coefficients Cr and Ci have adequate values, the calculated value $\phi$ becomes a replica of the phase jitter component contained in the input signal applied to the decision circuit 105. In response to the signal representing the value $\phi$, the phase rotating circuit 104 cancels the phase jitter component contained in the input signal applied to the decision circuit 105.

In order to correct the coefficients Cr and Ci adaptively into adequate values in each sampling cycle, the processor 118 of the predictive value correcting circuit employs the following algorithm: The second phase comparator 106 detects a phase error $\epsilon$ between an output signal S' from the phase rotating circuit 104 and an output signal D from the decision circuit 105 according to the equation:

$$\epsilon = \text{Im}[S' \bullet \text{conjg}(D)]$$

When the contents Cra and Cri of the respective first and second registers 116 and 117 are to be defined for the next sampling cycle, the processor 118 corrects the coefficients Cr and Ci according to the following recurrence formulas:

$$Cra = Cr - \delta \bullet \epsilon \bullet \sin \theta, \text{ and}$$

$$Cia = Ci - \delta \bullet \epsilon \bullet \cos \theta$$

where $\delta$ and $\delta'$ are predetermined constants.

By the correction according to these recurrence formulas, the coefficients Cr and Ci converge with the optimum values which satisfy the following equations $$\frac{\partial E[\epsilon^2]}{\partial Cr} = 0, \frac{\partial E[\epsilon^2]}{\partial Ci} = 0, \text{ respectively.}$$

The recurrence formulas show that the coefficients Cr and Ci are corrected by $$\frac{\partial \epsilon^2}{\partial Cr} \text{ and } \frac{\partial \epsilon^2}{\partial Ci}$$

for each sampling period, respectively. This method of converging a coefficient is commonly used in, for example, automatic equalizers using digital filters and is known as "MSE (Mean Square Error) Method".

With the arrangement of the preferred embodiment described above, the phase jitter component contained in the received signal is detected, its replica is generated, and the phase jitter component contained in the input signal applied to the decision circuit is canceled out according to the generated replica. Thus, transmission error in a data modem can be reduced for increased data transmission efficiency.

Although one preferred embodiment of the present invention has been shown and described in detail, it should be understood that various changes and modifications may be made in the embodiment without departing from the scope of the appended claims.

What is claimed is:

1. An apparatus for canceling periodic carrier phase jitter produced over a transmission line in a data modem receiver which receives QAM data from an analog line, said apparatus comprising:
   a sample-hold circuit means for sampling and holding a received signal in each cycle of a sampling cycle;
   an analog-digital converting means for converting an analog output signal from said sample-hold circuit means into a digital signal;
   demodulating means for demodulating said digital signal from said analog-digital converting means into a complex baseband signal;
   phase rotating means for imparting phase rotation corresponding to a separately applied predictive signal to said complex baseband signal from said demodulating means, thereby generating a complex baseband signal that is compensated for phase deviation;
   decision means for determining a data point of a two-dimensional data point matrix of modulated signals which is closest to said compensated complex baseband signal from said phase rotating means, in order to output a phase signal point vector corresponding to said determined data point;
   phase rotation angle predicting means for calculating a phase rotation angle predictive value to compensation for the phase deviation of said complex baseband signal based on a phase error between the complex baseband signal from said demodulating means and the phase signal point vector from said decision means, in order to output said predictive signal, which is representative of said phase rotation angle predictive value, to said phase rotating means; and
   predictive value correcting means for controlling said phase rotation angle predicting means to correct calculation of said predictive signal in the next sampling cycle based on the phase error between the complex baseband signal from said phase rotating means and the phase signal point vector from said decision means.

2. An apparatus according to claim 1, wherein said phase rotation angle predicting means comprises first phase comparing means for calculating said phase error between said complex baseband signal from said demodulating means and said phase signal point vector from said decision means, sine function generating means for generating a signal sine $\theta$, cosine function generating means for generating a signal cosine $\theta$, a first multiplying means for multiplying said phase error from said first phase comparing means by said signal cos $\theta$ from said cosine function generating means, a low-pass filter means for smoothing the output signal from said first multiplying means, an integrating means for integrating the output signal from said low-pass filter means and applying an integrated signal $\theta$ to said sine and cosine function generating means, a first register means for storing a coefficient Cr, a second register means for storing a coefficient Ci, a second multiplying means for calculating a signal Cr$\bullet$sin $\theta$ based on the output signal from said first register means and said signal from said sine function generating means, a third multiplying means for calculating a signal Ci$\bullet$cos $\theta$ based on the output signal from said second register means and said signal from said cosine function generating means, and a subtracting means for calculating the difference between output signals from said second and third multiplying means and applying said calculated difference as said predictive signal to said phase rotating means.

3. An apparatus according to claim 2, wherein said first multiplying means, said low-pass filter means, said integrating means and said cosine function generating means jointly serve as a phase-locked loop which is synchronized in phase with a periodic frequency component contained in the phase error calculated by said first phase comparing means.

4. An apparatus according to claim 2, which further includes amplifying means for amplifying the phase error from said first phase comparing means, and amplitude limiting means for limiting the amplitude of an output signal from said amplifying means and applying an amplitude-limited signal to said first multiplying means.

5. An apparatus according to claim 1, wherein said predictive value correcting means comprises second phase comparing means for calculating the phase error between the complex baseband signal from said phase rotating means and the phase signal point vector from said decision means, and processing means for effecting calculations according to the following recurrence formulas:

$$Cra = Cr - \delta \cdot \epsilon \cdot \sin\theta, \text{ and}$$

$$Cia = Ci - \delta' \cdot \epsilon \cdot \cos\theta$$

where Cra and Cia are the stored contents of said first and second registers in the next sampling cycle, respectively, $\epsilon$ is the phase error from said second phase comparing means, and $\delta$ and $\delta'$ are predetermined constants, and for applying output signals to update the stored contents of said first and second register means.

6. A method of cancelling periodic carrier phase jitter produced over a transmission line in a data modem receiver which receives QAM data from an analog line, said method comprising the steps of:

sampling and holding a received analog signal in each period of a sampling cycle;

converting said analog signal into a digital signal;

demodulating said digital signal into a complex baseband signal;

imparting phase rotation corresponding to a separately applied predictive signal to said complex baseband signal, thereby generating a complex baseband signal that is compensated for phase deviation;

determining a data point of a two-dimensional data point matrix of modulated signals which is closest to said compensated complex baseband signal, in order to output a phase signal point vector corresponding to said determined data point;

generating said predictive signal, which is representative of a phase rotation angle predictive value, to compensate for the phase deviation of said demodulated complex baseband signal based on a phase error between said demodulated complex baseband signal and said phase signal point vector; and detecting the phase error between said complex baseband signal, to which the phase rotation has been imparted, and said phase signal point vector in each sampling cycle in order to correct said predictive signal in the next sampling cycle.

7. Apparatus for cancelling periodic carrier phase jitter produced over a transmission line in a data modem receiver which receives QAM data from an analog line, said apparatus comprising:

a sample and hold circuit for sampling and holding a received signal in each period of a sampling cycle;

an analog to digital converter for converting an analog output signal from the sample and hold circuit into a digital signal;

a demodulator for converting the digital signal from the analog to digital converter into a complex baseband signal;

a phase rotator for imparting phase rotation to said complex baseband signal from said demodulator to compensate said complex baseband signal for phase deviation, thereby generating a compensated complex baseband signal;

means receiving an output from said phase rotator for providing a phase signal related to said compensated complex baseband signal;

phase rotation angle predicting means for calculating a phase rotation angle predictive value to compensate for the phase between the complex baseband signal from said demodulator and the phase signal from the means for providing, and providing a predictive signal to said phase rotator and to which said phase rotator is responsive to compensate said complex baseband signal for phase deviation; and predictive value correcting means for controlling said phase rotation angle predicting means for compensating said predictive signal in the next period of the sampling cycle based on the phase error between the compensated complex baseband signal from said phase rotator and the phase signal from said means for providing.

8. An apparatus according to claim 7 wherein said means for providing comprises decision means for determining a data point of a two dimensional data point matrix of modulated signals which is closest to said compensated complex baseband signal from said phase rotator, and providing as said phase signal a phase signal point vector corresponding to said determined data point; and said predictive value correcting means comprises means for controlling said phase rotation angle predicting means to correct equations for calculating said predictive signal in the next period of the sampling cycle based on the phase error between the compensated complex baseband signal from said phase rotator and the phase signal point vector from said decision means.

9. An apparatus according to claim 8, wherein said phase rotation angle predicting means comprises first phase comparing means for calculating said phase error between said complex baseband signal from said demodulator and said phase signal point vector from said decision means, sine function generating means for generating a signal $\sin\theta$, cosine function generating means for generating a signal $\cos\theta$, a first multiplying means for multiplying said phase error from said first phase comparing means by said signal $\cos\theta$ from said cosine function generating means, a low-pass filter means for smoothing the output signal from said first multiplying means, an integrating means for integrating the output signal from said low-pass filter means and applying an integrated signal $\theta$ to said sine and cosine function generating means, a first register means for storing a coefficient Cr, a second register means for storing a coefficient Ci, a second multiplying means for calculating a signal $Cr \cdot \sin\theta$ based on the output signal from said sine function generating means, a third multiplying means for calculating a signal $Ci \cdot \cos\theta$ based on the output signal from said second register means and said signal from said cosine function generating means, and a subtracting means for calculating the difference between output signals from said second and third multiplying means and applying said calculated difference as said predictive signal to said phase rotator.

10. An apparatus according to claim 9, wherein said first multiplying means, said low-pass filter means, said integrating means and said cosine function generating means jointly serve as a phase-locked loop which is synchronized in phase with a periodic frequency component contained in the phase error calculated by said first phase comparing means.

11. An apparatus according to claim 9, which further includes amplifying means for amplifying the phase error from said first phase comparing means, and amplitude limiting means for limiting the amplitude of an output signal from said amplifying means and applying an amplitude-limited signal to said first multiplying means.

12. An apparatus according to claim 8, wherein said predictive value correcting means comprises second phase comparing means for calculating the phase error between the compensated complex baseband signal from said phase rotator and the phase signal point vector from said decision means, and processing means for effecting calculations according to the following recurrence formulas:

$$Cra = Cr - \delta \bullet \epsilon \bullet \sin \theta, \text{ and}$$

$$Cia = Ci - \delta' \bullet \epsilon \bullet \cos \theta$$

where Cra and Cia are the stored contents of said first and second registers in the next period of the sampling cycle, respectively, $\epsilon$ is the phase error from said second phase comparing means, and $\delta$ and $\delta'$ are predetermined constants, and for applying output signals to update the stored contents of said first and second register means.

13. A method for cancelling periodic carrier phase jitter produced over a transmission line in a data modem receiver which receives QAM data from an analog line, said apparatus comprising:
   sampling and holding a received analog signal in each period of a sampling cycle;
   converting said analog signal into a digital signal;
   demodulating said digital signal into a complex baseband signal;
   imparting phase rotation in response to a control signal to said complex baseband signal, thereby generating a compensated complex baseband signal that is compensated for phase deviation;
   providing a phase signal related to said compensated complex baseband signal;
   generating said control signal for controlling the degree of phase rotation, which control signal is representative of a phase rotation angle predictive value, to compensate for the phase deviation of said demodulated complex baseband signal based on the phase error between said demodulated complex baseband signal and said phase signal related to said compensated complex baseband signal; and
   detecting the phase error between said compensated complex baseband signal and said phase signal in each period of the sampling cycle in order to correct said control signal in the next period of the sampling cycle.

14. A method as recited in claim 13 wherein said step of providing a phase signal comprises determining a data point of a two dimensional data point matrix of modulated signals which is closest to said compensated complex baseband signal, in order to output said phase signal comprising a phase signal point vector corresponding to said determined data point.

* * * * *